United States Patent [19]

Kim

[11] Patent Number: 4,649,330
[45] Date of Patent: Mar. 10, 1987

[54] CONTROLLING DEVICE OF A DRILL FOR REGULAR AND REVERSED ROTATION IN NON-CONTACT TYPE

[76] Inventor: In S. Kim, 134-21, Cheongdam-dong, Kangnam-Ku, Seoul, Rep. of Korea

[21] Appl. No.: 698,687

[22] Filed: Feb. 6, 1985

[30] Foreign Application Priority Data

Jun. 20, 1984 [KR] Rep. of Korea .................... 84-3457

[51] Int. Cl.$^4$ ............................................. H02P 3/20
[52] U.S. Cl. .................................. 318/756; 318/739; 408/11
[58] Field of Search ................... 200/153 LB, 153 T; 318/752–756, 739; 408/10, 11, 12, 14

[56] References Cited

U.S. PATENT DOCUMENTS

| | | | |
|---|---|---|---|
| 3,015,002 | 12/1961 | Laviana | 200/153 LB |
| 3,302,492 | 2/1967 | Weidig | 408/10 |
| 3,553,553 | 1/1971 | Truemper | 318/753 |
| 3,601,675 | 8/1971 | Radtke | 318/755 |
| 3,612,800 | 10/1971 | Scopa | 200/153 T |
| 3,818,295 | 6/1974 | Poppinger et al. | 318/752 |
| 4,196,375 | 4/1980 | Findeisen | 318/752 |

Primary Examiner—David Smith, Jr.
Attorney, Agent, or Firm—Birch, Stewart, Kolasch & Birch

[57] ABSTRACT

A device for changing the rotation of a drill from a forward to a reverse direction which comprises a drill, an AC single-phase motor operatively connected to the drill for driving the same, a circular measuring plate connected to the drill, the circular measuring plate having a handle, and a groove disposed on the periphery of the plate, and a microswitch containing electrical terminals and being operatively connected to the motor, the microswitch containing a bar which is pivotally disposed to engage and disengage the microswitch, the bar having a spring biased arm which extends from the microswitch to slidably engage and rotate with the periphery of the measuring plate, whereby when the handle of the measuring plate is rotated in the left or right direction, the bar of the microswitch is caused to move in a corresponding upward or downward direction along the periphery of the measuring plate, until it engages the slot whereby the direction of rotation of the motor is reversed.

2 Claims, 10 Drawing Figures

CONTROLLING DEVICE OF A DRILL FOR REGULAR AND REVERSED ROTATION IN NON-CONTACT TYPE

BACKGROUND OF THE INVENTION

1. Technical Field

The present invention relates to a control device for a drill for achieving regular and reversed rotation, and more particularly to a device in which a common load necessitates controlling the regular and reversed rotation of a drill using an AC single phase or three phase motor as the driving source.

2. Prior Art

In order to control the rotary direction of a drill in the prior art in both the regular and reversed direction, it is possible only by using an AC three-phase motor. To achieve this result, is is necessary not only to provide a switch but also a limit switch, and since it is possible to control the rotary direction to both the regular and reversed direction when it merely provides a switch extra for regular and reversed rotation, it is impossible to use a single-phase motor which causes a fall in operating efficiency because of the need to operate a switch unnecessrily case by case.

On the one hand, the present invention provides an AC single-phase motor as its driving source in order to solve the above defect in the prior art, but on the other hand, the applicant of the present application controls the regular and reverse operation of the device in which the rotational direction of a drill is controlled optionally by only one microswitch.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

The FIG. 1 is a perspective view at the present invention.

Figure 2:
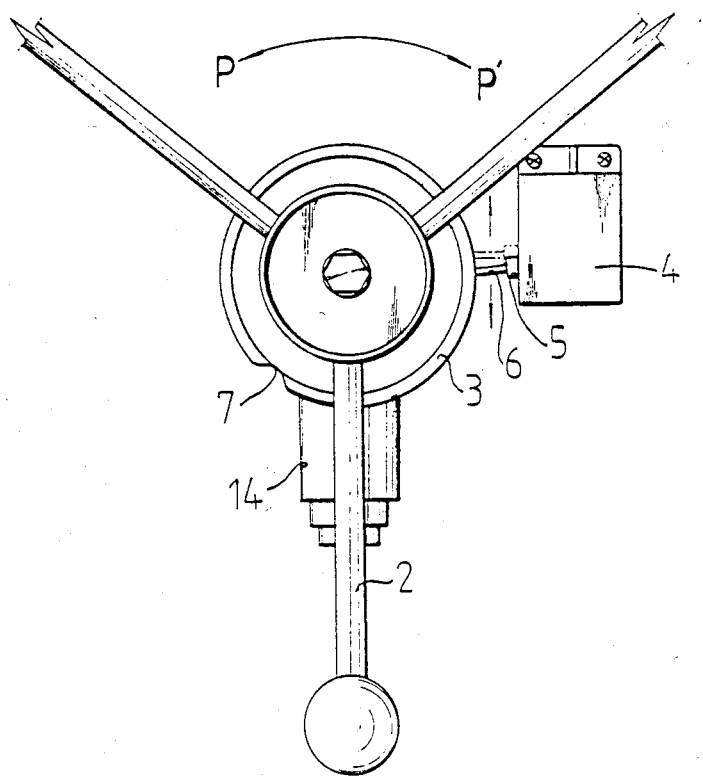

The FIG. 2 is a working explaining view of the preferred embodiment at the present invention.

Figure 3A:
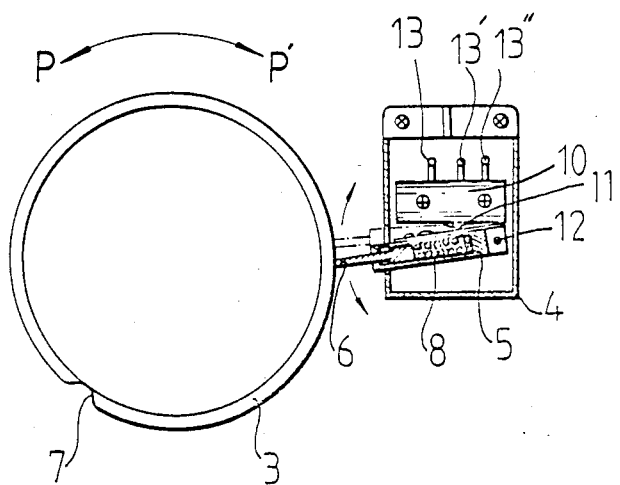
Figure 3B:
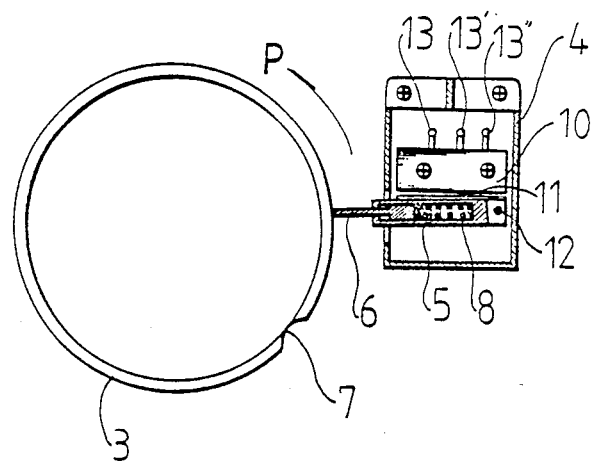
Figure 3C:
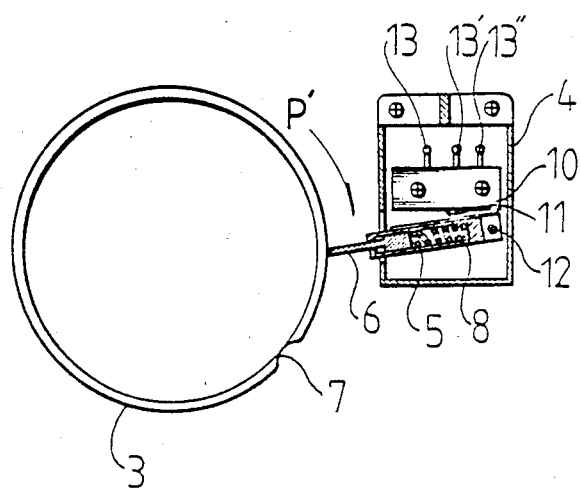
Figure 4A:
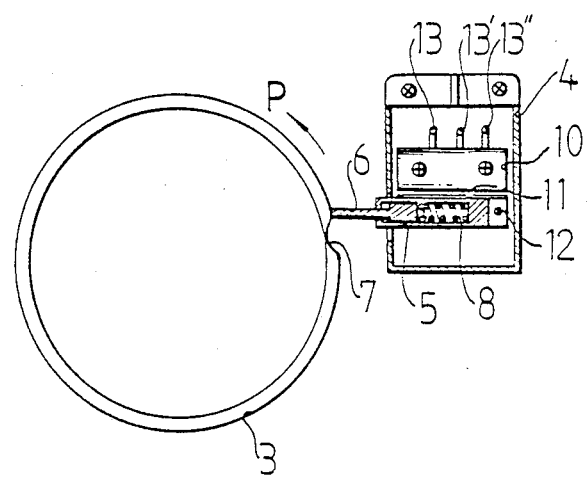
Figure 4B:
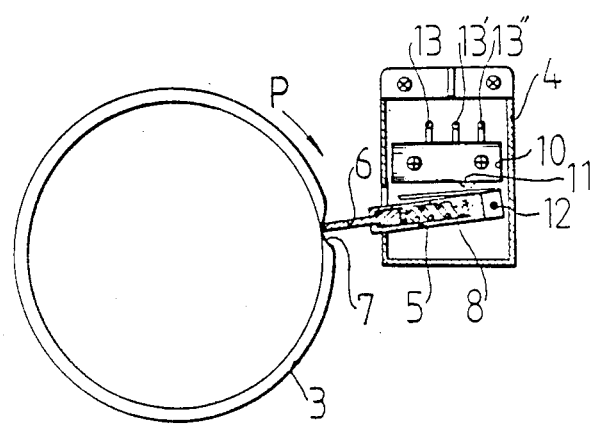

The FIG. 3 to 4 is a working explaining view for the essential portion of the preferred embodiment at the present invention.

Figure 1:
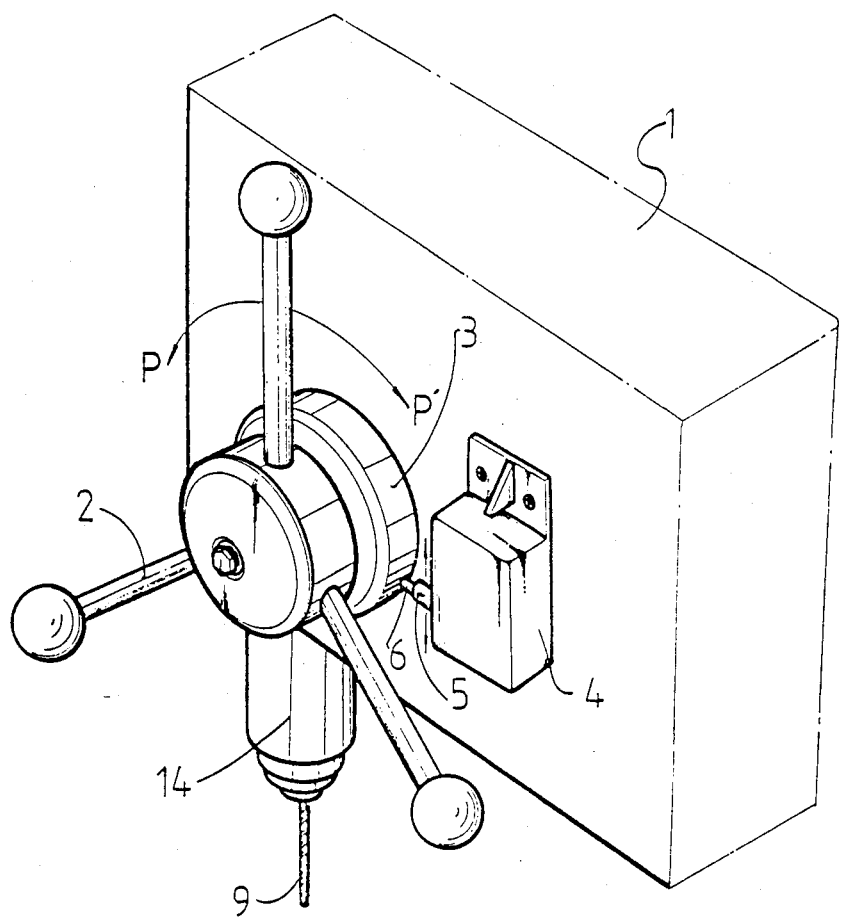

The FIG. 3-1 is a working explaining view for the essential portion at a regular rotation.

The FIG. 3-2 is a working explaining view for the essential portion at a reversed rotation.

The FIG. 4-1 is a working explaining view in a situation in which the top(6) is placed at the concave groove(7).

Figure 5:
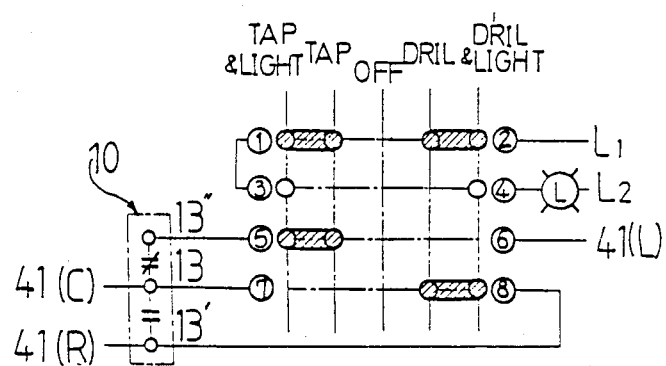

The FIG. 5 is a explaining view of the selector switch connection.

Figure 6:
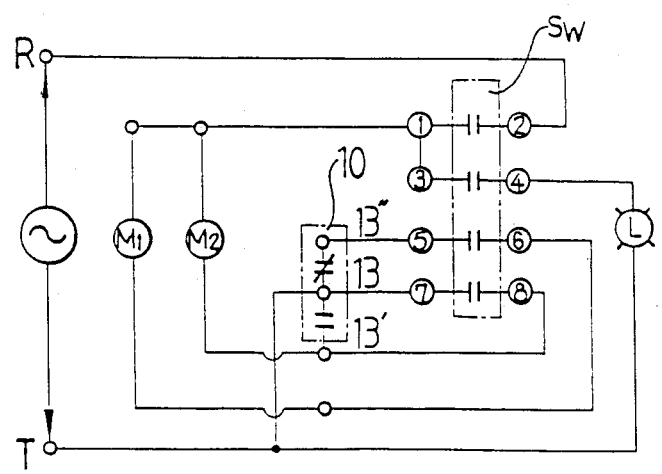

The FIG. 6 is an illustration view of a connection circuit which is provided for controlling of regular and reversed rotation in a contact type at the present invention.

Figure 7:
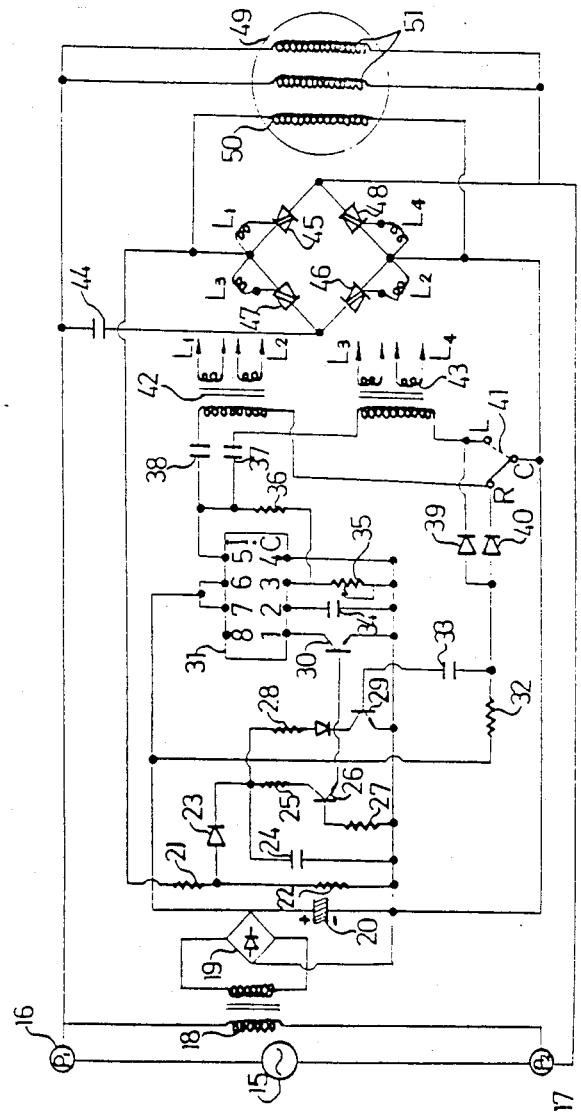

The FIG. 7 is a circuit view at the present invention.

DETAILED DESCRIPTION

The present invention shall be described according to the appended drawings which represent a preferred embodiment thereinafter.

FIG. 1 is a prespective view of one preferred embodiment of the present invention comprising a microswitch box(4) a rotating plate 3 provided with a handle(2), as spring biased arm(6) extending from the bar(5), and a groove(7) provided on the plate 3 for engagement with the arm 6.

According to the present invention, in the case where the handle(2) is rotated in the P direction of the arrow, namely to the left, and the drill bit(9) is lowered, the microswitch push knob(11) of the microswitch(10) which is in contact with the rotating, graduation plate(3), rotating with the handle(2) as shown in the FIG. 3 and 4, is pushed upwards, and in the case where the handle(2) rotates in the P direction of the arrow, namely, to the right, then the knob of the microswitch is pushed downwards by the contact which is made by the bar(5) which pivots around the shaft(12) and engages with the plate 3 through the spring biased action of the coil spring(8).

The electrical circuit for the present invention will now be described.

A bridge is connected with the triac elements(45)(46) (47)(48) between the starting coil(50) and the starting condenser, and if triac(45)(46) and triac(47)(48) are conducted alternately, then the rotation of the motor progresses in accordance with the changing phase of the starting coil.

Accordingly, a high-frequency oscillation circuit is regulated by the IC(31) in order to change the triac(45)(46) and the triac(47)(48) alternately, and the triac becomes a trigger to function alternately when its oscillation output turns the output transformer ON and OFF by the microswitch(41).

However, the voltage of the starting coil(50) of a motor which is generated thereby is suspended at the power source in series with the starting condenser at an instant at which the motor can not start and restricted, therefore a power source voltage appears in sharing and becomes a low voltage according to the reactance share, afterwards it is increased gradually in accordance with an increasing belocity of the motor and further its inducted voltage becomes to increase when the velocity reaches to normal one.

At this time, when the motor velocity reaches at 70% of the normal velocity, then a working which isolates the starting condenser therefrom is obtained at a controlling part of the IC.

To explain the principle of the said working, the voltage inducted from the starting coil(50) of the motor is shared by means of the resistance(21) and (22), and the AC voltage which is shared at the resistance(22) is in half-wave rectified by the diode(23) and a DC voltage which is filtered into the condenser(24) is added to a collector of the transistor(26) through the resistance(25).

The transistor(26) does not play an one-side amplifying of a voltage-current but plays a working of a constant voltage as the ZENER DIODE.

However, when a velocity of the motor is increased and reaches at 70% of normal velocity, an inducted voltage of the starting coil and DC voltage obtained thereof is suspended between a collector of the transistor(26) and the emitter, and if the said voltage reaches more than 75 V, then the transistor(26) becomes breakdown and it becomes a conducting situation between the collector and emitter, and further it makes the transistor(30) ON.

ZENER diode or neon can be used instead of the transistor(26) and obtains a same effect. The resistance(25) plays to limit this electron avalance current at this time. However No. ①  terminal of the IC(31) stops to oscillate when the phase becomes ⊖ after its internal structure.

Accordingly as the transistor(30) is then conducted and No. ① terminal of the IC(31) becones⊖phase, therefore it stops to oscillate, furthermore an oscillation output added to the output transistor (42)(43) is lost and the triac(45)(46) become OFF and the motor continues to operate normally.

Hereby if the microswitch(41) is removed from R to L side in order to get a reversed rotation, then the DC current of the condenser is touched at the transistor(29) through the resistance(28), and a pulse voltage is formed by means of an alternate working of the condenser (33) and diode(39)(40) at the instant at which the circuit is isolated at the switch(41), consequently the transistor(29) is conducted and at the same time an electric charge which is charged in the condenser(24) is discharged, therefore the transistor(26) and (30) become OFF at the same time and IC(31) begins to oscillate again, and further the output transformer(43) is operated by the switch(41) and the triac(47)(48) are conducted at the same time, as a current flows into a reversed direction the motor(48) which is rotated into a regular direction is stopped and is started to a reversed direction at the instant, and a same working to the rotation in a regular direction is started at a controlling section through a starting coil voltage which is inducted proportionally to the velocity, and finally a normal operation could be obtained.

To explain more in detail, since the resistance(32) and diode (39)(40) are connected to a forward, a phase of a connecting point of the resistance(32) and the condenser maintains about 0.7 V when the microswitch is at R or L, but a short pulse voltage as large as a current voltage of the IC generates since the current does not flow into the diode(39)(40) for a short term as at the instant at which switch(41) is removed from R to L side.

The said pulse voltage is added to a base of the transistor(29) through the condenser(33) and then transistor(29) is conducted, consequently a voltage of the condenser(24) is discharged, the transistor(26) and (30) become OFF, then an oscillation of the IC starts again and its output makes triac(47)(48) in a trigger through the output matching transformer(43) and the direction of the starting coil is changed, accordingly it becomes a rotation to a reversed direction.

The unshown mark(13) in the drawings is connected to the No. ⑦ terminal of the selecter switch which is shown in the circuit view of the FIG. 5 by a common terminal of the microswitch(10)(13') is connected to No. ⑤ terminal of the selecter switch and (13") is connected to No. ⑧ terminal of the selecter switch.

Since it is a structure formed as the above said, in the FIG. 5 the current is opened and shut at the terminal ⊕ No. ①-No. ② of the selecter switch(SW) and the working lamp is switched on and off at the terminal No. ③-No. ④, further 13'(L) of the microswitch(10) is connected to the terminal No. ⑤, the 13(C) is connected to the terminal No. ⑦ and 13"(R) is connected to the terminal No. ⑧, afterwards the motor is stopped when the SW is switched off and it becomes tapping as changing in regular and reversed in accordance with a moving of the handle(2) of rotary shaft up and down when it is put at the Tap, further the working lamp is switched on as changing in tapping when it put in Tap & Light. The drill operates only when the SW is put in the drill side and accordingly regular and a reversed rotation is stopped, and the working lamp is switched on as changing into a drill operation when it is put in Drill & Light.

The FIG. 6 shows a prefered embodiment in which the controlling device for regular and reversed rotation of the present invention is applied to an electronic shutter circuit in a contact type.

In the FIG. 6 a circuit is formed as power source(R)-SW ② - ① )-magnetswitch(M2)-microswitch(13'-13)-power source(T) if the handle(2) is rotated slowly to the arrow(P)'s direction and further the motor bigins to change into a regular rotation so as to be a tapping motion, in case the shaft(12) is rotated continuously, then the graduation plate(3) which rocates together with the said rotation begins to rotate, as shown in FIG. 4, the top(6) comes outside from the bar(5) by a velocity of the coil-spring(8) which is equipped springily in bar(5) when the concave groove(7) reaches in the top(6) side, further the operation which is slided by the graduation plate(3) till now is then stopped an fallen into the concave groove(7), therefore power source is changed from the moving terminal(13") since the bar(5) falls into the arrow(0)'s direction by a velocity of the microswitch push knob(11) of the known microswitch(10) centring around the shaft(12), further at this time, as shown in FIG. 6, the circuit structure is connected as power source(R)-SW(2-1)-magnetswitch(M1)-SW( ⑥-⑤))-(13") of the microswitch(10)-(13) of the (10)-power source (T) and then (M1) is switched on and (M2) is switched off, accordingly the regular rotation till now is changed into a reversed rotation.

In the situation as the above, the handle(2) rotates to the arrow(P')'s direction when it is laid down, however the top(6) is slided by the graduation plate(3) at this time and it is held to the arrow(0)'s direction as it is.

And the working lamp(L) is lighted always since the terminal No. ③-④ is switched on when the selecter switch(SW) is put in Tap & Light. Furhtermore a regular and reversed rotation become freely in accordance with a motion of the handle(2) up and down because the terminal No. ⑤-⑥ of SW is switched on and the terminal No. ⑦-⑧ switched off when the selecter switch(SW) is put in Tap & Light side, further the terminal No. ⑤-⑥ is switched off and No. ⑦-⑧ is switched on when the SW is put in Drill or Drill & Light side, consequently it continues only a regular rotation regardless of a position of the handle(2).

Accordingly, according to the present invention the microswitch(41) which is shown in FIG. 7 is changed to the microswitch(10) shown in FIG. 5 after the connecting method shown in FIG. 5, further the terminal No. ①-② of SW is switched on when SW is put in Tap or Drill side and the terminal No. ①-② and No. ③-④ are switched on respectively when SW is put in Tap & Light or in Drill & Light, accordingly it could be used both as drill and tapping, further such a motion installs the top(6) in form "T" which is supported springily by the coil spring(8) at the bar(5) in column form which is supported by bearing at the shaft(12) so as to slide at the graduation plate(3), and as it is simply to execute by means of concaving of the concave groove(7) at the graduation plate(3), it is easy to install it at the publicly known drill, accordingly it enables to increase a working efficiency.

In the other hand, the present invention is provided in order to accomplish the object so as to enable not only to be limited for use of a bar in a round tube form but also enable to use bars in various styles in a cave form, and further the present invention also can achieve the object through an equipping of a roller at a top which is jutted in a "T" form.

What is claimed is:

1. A device for changing the rotation of a drill from a forward to a reverse direction which comprises
   a drill,
   an AC single-phase motor operatively connected to said drill for driving the same,
   a circular measuring plate connected to said drill, said circular measuring plate having a handle, and a groove disposed on the periphery of said plate, and
   a microswitch containing electrical terminals and being operatively connected to said motor, said microswitch containing a bar which is pivotally disposed to engage and disengage said microswitch, said bar having a spring biased arm which extends from said microswitch to slidably engage and rotate with the periphery of the measuring plate, whereby when the handle of the measuring plate is rotated in the left or right direction, the bar of the microswitch is caused to move in a corresponding upward or downward direction along the periphery of the measuring plate, until it engages said slot whereby the direction of rotation of the motor is reversed.

2. The device of claim 1 wherein the spring of the bar is a coiled spring.

* * * * *